United States Patent [19]

Denzinger et al.

[11] 3,992,562
[45] Nov. 16, 1976

[54] MANUFACTURE OF INSOLUBLE AND ONLY SLIGHTLY WATER-SWELLABLE POLYMERS OF N-VINYL LACTAMS OF IMPROVED ADSORPTIVITY

[75] Inventors: Walter Denzinger, Speyer; Ernst Hofmann; Karl Herrle, both of Ludwigshafen, Germany

[73] Assignee: BASF Aktiengesellschaft, Ludwigshafen (Rhine), Germany

[22] Filed: July 7, 1975

[21] Appl. No.: 593,761

[30] Foreign Application Priority Data
Aug. 5, 1974  Germany............................ 2437629

[52] U.S. Cl................................ 526/208; 526/222; 526/225; 526/264
[51] Int. Cl.² .............. C08F 126/06; C08F 226/06; C08F 226/10; C08F 126/10
[58] Field of Search.................. 260/80.3 R, 80.3 N, 260/88.3 L, 80.72; 526/208, 222, 225, 264

[56] References Cited
UNITED STATES PATENTS

| | | | |
|---|---|---|---|
| 2,927,913 | 3/1960 | Grosser | 260/88.3 L |
| 2,938,017 | 5/1960 | Grosser | 260/88.3 L |

Primary Examiner—Harry Wong, Jr.
Attorney, Agent, or Firm—Johnston, Keil, Thompson & Shurtleff

[57] ABSTRACT

Manufacture of insoluble polyvinyl lactams by polymerization in the absence of oxygen and in the presence of sulfur compounds having a functionality of less than 6.

7 Claims, No Drawings

MANUFACTURE OF INSOLUBLE AND ONLY SLIGHTLY WATER-SWELLABLE POLYMERS OF N-VINYL LACTAMS OF IMPROVED ADSORPTIVITY

The literature describes a variety of processes for the manufacture of insoluble and only slightly water-swellable polymers of vinyl lactams. According to U.S. Pat. No. 2,938,017, the polymerization is carried out in the absence of water and in the presence of alkalis at temperatures greater than 150° C. The process described in German Published Application Pat. No. 1,268,391 consists in partially polymerizing, say, vinyl pyrrolidone in the presence of alkalis and small amounts of water at from 125° to 200° C and then completing polymerization at from 80° to 100° C. According to German Published Application 2,059,484, the problem is solved by carrying out the polymerization in the presence of small amounts of a cyclic acid amide such as divinyl ethylene urea, polymerization taking place on metal surfaces which are capable of being attacked by oxygen. However, this process is not completely satisfactory. It is difficult to control as the polymerization reaction requires starting periods of a duration difficult to foresee.

On account of the long reaction time, the high temperature and the high pH values, the products show a brown discoloration. The last-named process provides satisfactory results as regards the properties of the polyvinyl lactams, but the products are too coarse and it is therefore necessary, in a number of applications, to subject them to grinding.

It is an object of the present invention to provide insoluble and only slightly water-swellable polylactams or copolymers thereof in the form of very fine granules showing good adsorptivity and good filtering properties.

We have now found a process for the manufacture of insoluble and only slightly swellable polymers or copolymers of N-vinyl lactams in dilute aqueous solution and in the presence of a cyclic acid amide containing at least two ethylenically unsaturated groups of which at least one is attached to the amide nitrogen atom, which process is characterized in that the polymerization is carried out in the absence of oxygen and in the presence of from 0.05 to 2% by weight, based on vinyl lactam, of at least one sulfur compound having a functionality of less than 6.

The concentration of the vinyl lactam in the reaction mixture is advantageously such as to maintain the mixture in a readily stirrable state throughout the reaction. When using conventional stirred vessels, this concentration is from about 5 to 20% and preferably from 5 to 10%, by weight of the water present. The concentration may be raised to 40% by weight, if particularly powerful stirrers are available.

It may be advantageous to start the process at a relatively high concentration and to add water in the course of polymerization in order to maintain the mixture in a readily stirrable state or to make it stirrable toward the end of the reaction.

Vinyl lactams suitable for use in the present invention are, primarily, N-vinyl pyrrolidone and N-vinyl caprolactam; other lactams such as N-vinyl piperidone and the corresponding homologs may also be polymerized by our process. Moreover, the different N-vinyl lactams may be copolymerized with each other if desired. For example, use is made of N-vinyl pyrrolidone and from 5 to 100% by weight, based on the N-vinyl pyrrolidone, of one of the other said N-vinyl lactams.

Apart from water and the said monomers, the mixture contains from about 0.5 to 10%, by weight of said monomers, of a cyclic acid amide, containing at least two ethylenically unsaturated groups of which at least one is attached to an amide nitrogen atom. We prefer to use divinyl ethylene urea. This compound initiates the particular polymerization reaction leading to the formation of an insoluble and only slightly swellable polymer. The free-radical initiators conventionally used for such polymerizations need not be employed. In any case, they would produce only highly swellable polymer portions.

Polymerization is advantageously carried out at pHs above 6 to avoid saponification of the N-vinyl lactam. Advantageously, polymerization is carried out in a pH range of froom 7 to 9, since higher pHs might lead to yellowing of the polymer. The desired pH is obtained by adding small amounts of alkalis such as sodium hydroxide, ammonia or the conventional buffer salts such as sodium carbonate, sodium bicarbonate, sodium phosphate and sodium acetate. Urea and ammonium carbonate are also suitable.

Polymerization is effected in the absence of oxygen. This may be effected by applying a vacuum to the point where simmering occurs at a given temperature or by means of an inert gas. Usually, polymerization begins spontaneously when the oxygen is removed.

It is well known that oxygen may suppress free radical polymerization. However, it is surprising that this is the case in the present process. As indicated above, no free radical initiators are used in the present process; in fact, they are deliberately excluded, since they merely lead to the formation of relatively soluble and highly swellable polymers.

The temperature at which polymerization is carried out may vary within wide limites and is advantageously from 50° to 100° C. Although it is possible to operate at higher or lower temperatures, no particular advantages are gained thereby.

The essential feature of the invention exists in polymerization in the presence of from about 0.05 to 2% and preferably from 0.1 to 0.5%, by weight of vinyl lactam, of at least one sulfur compound having a functionality of less than 6. By such sulfur compounds we mean, for example, the representatives having a functionality of 4 (derivatives of sulfurous acid), the trifunctional representatives (dithionites), the difunctional representatives (sulfoxylates) and, finally, the representatives having a functionality of minus 2 (sulfides). Thus, particularly suitable products of this kind are sodium sulfide, sodium sulfite, sodium pyrosulfite, sodium dithionite, sodium sulfoxylate and/or sodium formaldehyde sulfoxylate. The addition of said substances to the mixture is advantageously carried out after the oxygen has been removed.

The polymerization rate is generally little influenced by the additions, but there are cases in which either acceleration or deceleration of polymerization is caused thereby. The decisive effect achieved by the addition of said substances consists in the increased adsorptivity of the polymers particularly for tannins occurring, for example, in vegetable beverages. Consequently, the polymers produced in the process of the invention are extremely useful as clarifying agents for vegetable beverages such as beer, wine and fruit juices.

The invention is illustrated but not restricted by the following Examples, in which the parts are by weight.

EXAMPLES

The adsorptivity of the polymers described below was determined as follows:

100 mg of polymer are placed in 100 ml of a 0.01% tannin solution and shaken therein. Samples are taken at intervals and the polymer is separated by filtration and the residual content of tannin in the filtrate is determined using a 2 mm cuvette in a spectrophotometer at 270 nm. The results are given in percentages of the starting amount after 10 and 40 minutes.

EXAMPLE 1

900 parts of distilled water, 100 parts of vinyl pyrrolidone and 2 parts of divinyl ethylene urea are mixed in a stirred flask. The pH of the solution is adjusted to about 9.5 by the addition of 0.5 part of a 10% solution of sodium hydroxide in water. The solution is then heated to 60° C by vigorously bubbling nitrogen therethrough. A sodium dithionite solution is then added in the amounts given below and the rate of flow of the nitrogen stream is reduced. As soon as the temperature reaches 60° C or at most only a few minutes thereafter, the otherwise clear solution is seen to contain small white flakes which increase in size and number at first only slowly but later at a rapid rate. Depending on the amount of dithionite added, there occurs after from 10 to 200 minutes a distinct reaction which is checked by slight cooling. The mixture is then maintained at 60° C for a further hour and then cooled. There is obtained a pure white suspension of a creamy nature. The polymer is filtered off, washed thoroughly with water and dried in vacuo at 70° C.

Tests on the tannin-binding capacity as outlined above give the following results:

| 10% Dithionite solution ml. | Residual tannin after | |
|---|---|---|
| | 10 min | 40 min |
| 0 | 76% | 56% |
| 0.5 | 42% | 33% |
| 1 | 22% | 16% |
| 2 | 17% | 17% |
| 3 | 19% | 14% |
| 5 | 17% | 15% |

EXAMPLE 2

850 parts of distilled water, 150 parts of vinyl pyrrolidone, 3 parts of N,N'-divinyl ethylene urea and 0.75 part of secondary sodium phosphate as buffer substance are mixed in a stirred flask. The pH is found to be about 7. The mixture is substantially freed from atmospheric oxygen and simultaneously heated to 60° C by the introduction of a vigorous stream of nitrogen. Gel particles form immediately and these grow very rapidly. After about 30 minutes, the mixture becomes pasty and a short reaction takes place. Polymerization is carried to completion at 60° C for a further hour and the mixture is then cooled. The pH of the suspension is about 6. The polymer is worked up as described in Example 1.

The white-colored, somewhat coarse and hard polymer is tested for residual tannin content and gives the following results:
after 10 minutes — 81%
after 40 minutes — 61%.

After milling in a jet mill, the corresponding values are as follows:
after 10 minutes — 58%
after 40 minutes — 45%.

EXAMPLE 3

The same batch as used in Example 2, except that it contains 0.75 g of sodium carbonate as buffer substance in place of secondary sodium phosphate (pH of batch about 8), is heated to 60° C. The mixture is then brought to the simmer at 60° C by applying a vacuum (about 200 mbar absolute) and 3 g of 10% sodium tetrathionite solution in water are than added immediately. The first gel particles are seen to occur after about 15 minutes and these grow slowly. After about 1 hour the reaction occurs, accompanied by a steep increase in viscosity, with the result that the mixture must be diluted with 300 parts of water. Polymerization is carried to completion over a further hour and the mixture is worked up as described in Example 1. Residual tannin
after 10 minutes — 60%
after 40 minutes — 44%.

EXAMPLE 4

The same mixture as used in Example 2, except that 1.5 g of sodium acetate are used as buffer substance, is heated to 60° C after purging with nitrogen, and 30 g of sodium pyrosulfite solution (10% in water) are added. Flocculation occurs immediately. The flakes grow slowly and after about 90 minutes a moderate reaction occurs which causes thickening of the mixture, as a result of which the latter must be diluted with 500 parts of water to prevent the stirrer from stopping. Polymerization is carried to completion over a further hour. The pH of the mixture remains about 7 throughout the experiment. Working up is carried out as described in Example 1.

The residual tannin amounts are as follows:
after 10 minutes — 27%
after 40 minutes — 21%.

EXAMPLE 5

The same mixture as used in Example 2, except that 0.75 g of sodium bicarbonate are used in place of secondary sodium phosphate, is heated to 60° C with nitrogen purging and 6 g of a 5% aqueous solution of sodium sulfide and 7.5 g of a 10% aqueous solution of formaldehyde sodium sulfoxylate are added immediately. The flakes which form immediately grow rapidly. After about 15 minutes, the mixture becomes very thick whilst exhibiting a distinct heat effect and it is necessary to dilute the mixture with 500 parts of water to prevent the stirrer from stopping. The pH remains constant at about 7. Polymerization is carried to completion over a further hour and working up is carried out as described in Example 1.

Residual amounts of tannin adsorbed are as follows:
after 10 minutes — 60%
after 40 minutes — 40%.

EXAMPLE 6

The mixture used in Example 2 is purged with nitrogen, heated to 40° C and 3 g of an aqueous 10% solution of sodium dithionite are added immediately. The first flakes are seen to form after about 45 minutes and these grow rapidly. After a further hour, the mixture becomes very viscous on account of a brief reaction and it is necessary to dilute the mixture with 500 parts of water. Polymerization is carried to completion over a further hour and cooling and working up are carried out as described in Example 1.

The residual amounts of tannin are as follows:
after 10 minutes — 41%
after 40 minutes — 31%.

EXAMPLE 7

150 parts of distilled water, 100 parts of vinyl pyrrolidone, 2 parts of N,N'-divinyl ethylene urea and 1 ml of 2N caustic soda solution are mixed in a stirred vessel equipped with a double helical stirrer and are heated to 40° C with nitrogen purge. There are then added 2 g of 10% aqueous sodium dithionite solution. Flakes formed immediately grow only slowly. After about 2 hours, the mixture becomes very thick and causes the stirrer to stop. Following dilution with 1500 parts of water, the mixture is again readily stirrable. Polymerization is carried to completion over a further hour and the mixture is cooled and worked up as described in Example 1.

The residual amounts of tannin in the tannin adsorption test are as follows:
after 10 minutes — 38%
after 40 minutes — 28%.

EXAMPLE 8

900 parts of demineralized water, 100 parts of vinyl pyrrolidone, 2 parts of N,N'-divinyl ethylene urea and 2.5 ml of 2N caustic soda solution are mixed in a stirred vessel. The pH of the mixture is 11. The mixture is purged with nitrogen and heated to 60° C, and 5 g of 10% aqueous sodium dithionite solution are added immediately. Flakes form immediately and grow slowly at first but more rapidly after a time. After about 1 hour the mixture becomes very viscous whilst exhibiting a weak heat effect. Following this reaction, polymerization is completed for a further hour and the mixture is then cooled and worked up as described in Example 1.

Unlike the polymers described in Examples 1 to 7, the present polymer is a pale brown in color and gives the following residual amounts of tannin in the tannin adsorption test:
after 10 minutes — 17%
after 40 minutes — 16%.

We claim:
1. A process for the manufacture of insoluble and only slightly swellable homopolymers of an N-vinyl lactam or copolymers of two or more vinyl lactams selected from the group consisting of N-vinyl pyrrolidone, N-vinyl caprolactam and N-vinyl piperidone which comprises: polymerizing the vinyl lactam or the mixture of vinyl lactams in a dilute aqueous solution of said lactam or lactams at a pH of 6 to 10 with the exclusion of oxygen, said polymerization taking place in the presence of
    a. divinyl ethylene urea, and
    b. from 0.05 to 2% by weight, based on the vinyl lactam of at least one sulfur compound selected from the group consisting of sodium sulfide, sodium sulfite, sodium pyrosulfite, sodium dithionate, sodium sulfoxylate and sodium formaldehyde sulfoxylate.

2. A process as set forth in claim 1, wherein the vinyl lactam polymerized is vinyl pyrrolidone.

3. A process as set forth in claim 1, wherein the vinyl lactams copolymerized are vinyl pyrrolidone and from 5 to 100% by weight, based on vinyl pyrrolidone, of another vinyl lactam selected from the group consisting of N-vinyl caprolactam and N-vinyl piperidone.

4. A process as set forth in claim 1, wherein polymerization is carried out at from 50° to 100° C.

5. A process as set forth in claim 1 wherein the amount of divinyl ethylene urea is from about 0.5 to 10% by weight of said lactam or lactams.

6. A process as set forth in claim 1 wherein said pH range is from 7 to 9.

7. A process as set forth in claim 1 wherein the amount of said sulfur compound or compounds is from 0.1 to 0.5% by weight.

* * * * *